United States Patent
Hoganson et al.

(10) Patent No.: US 9,292,823 B2
(45) Date of Patent: Mar. 22, 2016

(54) PNEUMATIC TRANSPORT DELIVERY CONTROL

(71) Applicant: TRANSLOGIC CORPORATION, Denver, CO (US)

(72) Inventors: Kenneth Michael Hoganson, Aurora, CO (US); John Alan Kennedy, Aurora, CO (US)

(73) Assignee: TRANSLOGIC CORPORATION, Denver, CO (US)

( * ) Notice: Subject to any disclaimer, the term of this patent is extended or adjusted under 35 U.S.C. 154(b) by 0 days.

(21) Appl. No.: 14/314,714

(22) Filed: Jun. 25, 2014

(65) Prior Publication Data

US 2014/0343724 A1    Nov. 20, 2014

Related U.S. Application Data

(63) Continuation of application No. 12/574,863, filed on Oct. 7, 2009, now Pat. No. 8,793,014.

(60) Provisional application No. 61/104,162, filed on Oct. 9, 2009.

(51) Int. Cl.
   G06F 7/00       (2006.01)
   G06Q 10/08      (2012.01)
   B65G 51/44      (2006.01)

(52) U.S. Cl.
   CPC ............... *G06Q 10/08* (2013.01); *B65G 51/44* (2013.01)

(58) Field of Classification Search
   CPC ............... G05B 19/41865; G05B 2219/45031; H01L 21/67276; G06Q 10/08
   USPC .......................................................... 700/228
   See application file for complete search history.

(56) References Cited

U.S. PATENT DOCUMENTS

| 1,953,987 A | 4/1930 | Hohne |
| 1,823,056 A | 9/1931 | Marburg |
| 2,043,293 A | 6/1936 | Jennings |
| 3,055,612 A | 7/1936 | Stout et al. |

(Continued)

FOREIGN PATENT DOCUMENTS

WO    2006053316 A2    5/2006

OTHER PUBLICATIONS

Bacheldor, Beth, "At Mayo Clinic, RFID Tracks Biopsies," RFID Journal, Jan. 9, 2007.

*Primary Examiner* — Kyle Logan
(74) *Attorney, Agent, or Firm* — Marsh Fischmann & Breyfogle LLP

(57) ABSTRACT

The presented inventions seek to create a verifiable and closed loop chain-of-custody for a specific transaction in a pneumatic tube transport system while allowing a sender and recipient to perform asynchronous activity. That is, one aspect the presented inventions allows a sender to securely send a carrier to a desired recipient while allowing the desired recipient to receive the secured carrier at a convenient time and/or location without tying up system resources. Another aspect improves the physical barriers between high value payloads and the unintended recipients. This is done in part by introducing randomness into the carrier delivery process such that no member of the general public or facility staff knows the location and/or delivery time of a secured carrier without having access to specific database records indicating the current location and/or delivery status of the secured carrier.

11 Claims, 8 Drawing Sheets

(56) References Cited

U.S. PATENT DOCUMENTS

| | | |
|---|---|---|
| 2,174,718 A | 10/1939 | Drekard, Jr. |
| 2,679,990 A | 6/1954 | Mathzeit et al. |
| 2,709,555 A | 5/1955 | Schroder |
| 2,773,658 A | 12/1956 | Otteren et al. |
| 2,797,057 A | 6/1957 | Sindzinski et al. |
| 2,815,182 A | 12/1957 | Mittag et al. |
| 2,850,249 A | 9/1958 | Understadt |
| 2,865,578 A | 12/1958 | Hennessy |
| 2,943,814 A | 7/1960 | Mittag et al. |
| 2,970,791 A | 2/1961 | Hafner et al. |
| 2,997,253 A | 8/1961 | Mittag et al. |
| 3,055,611 A | 9/1962 | Stout et al. |
| 3,148,845 A | 9/1964 | Buchwald et al. |
| 3,219,989 A | 11/1965 | Kuhrt et al. |
| 3,223,353 A | 12/1965 | Kuhrt et al. |
| 3,238,515 A | 3/1966 | Schrader et al. |
| 3,265,325 A | 8/1966 | Buchwald et al. |
| 3,295,662 A | 1/1967 | Crosby et al. |
| 3,332,639 A | 7/1967 | Joy |
| 3,333,787 A | 8/1967 | Voitas et al. |
| 3,361,384 A | 1/1968 | Thorburn |
| 3,408,113 A | 10/1968 | Bouladon |
| 3,507,460 A | 4/1970 | Norman et al. |
| 3,629,231 A | 12/1971 | Kalthoff |
| 3,813,058 A | 5/1974 | Smith et al. |
| 3,892,372 A | 7/1975 | Hauber |
| 4,058,274 A | 11/1977 | Hochradel et al. |
| 4,234,270 A | 11/1980 | Kalina |
| 4,240,768 A | 12/1980 | Carstens |
| 4,502,215 A | 3/1985 | Davis et al. |
| 4,509,123 A | 4/1985 | Vereen |
| 4,516,888 A | 5/1985 | Kardinal |
| 4,529,335 A | 7/1985 | Hilbert et al. |
| 4,630,216 A | 12/1986 | Tyler et al. |
| 4,646,245 A | 2/1987 | Prodel et al. |
| 4,786,229 A | 11/1988 | Henderson |
| 4,831,540 A | 5/1989 | Hesser |
| 4,941,181 A | 7/1990 | Igarashi et al. |
| 4,971,481 A | 11/1990 | Foreman |
| 4,974,166 A | 11/1990 | Maney et al. |
| 5,097,421 A | 3/1992 | Maney et al. |
| 5,153,842 A | 10/1992 | Dulugos et al. |
| 5,166,884 A | 11/1992 | Maney et al. |
| 5,190,428 A | 3/1993 | Bryant et al. |
| 5,196,846 A | 3/1993 | Brockelsby et al. |
| 5,217,328 A | 6/1993 | Lang |
| 5,225,990 A | 7/1993 | Bunce et al. |
| 5,234,292 A | 8/1993 | Lang |
| 5,260,694 A | 11/1993 | Remahl |
| 5,386,364 A | 1/1995 | Tyler |
| 5,434,790 A | 7/1995 | Saka et al. |
| 5,436,611 A | 7/1995 | Arlinghaus, Jr. |
| 5,562,367 A | 10/1996 | Scott |
| 5,655,677 A | 8/1997 | Fratello et al. |
| 5,661,743 A | 8/1997 | Nagai |
| 5,712,789 A | 1/1998 | Radican |
| 5,864,485 A | 1/1999 | Hawthorne et al. |
| 5,867,388 A | 2/1999 | Okumura et al. |
| 5,959,268 A | 9/1999 | Woolley |
| 6,024,208 A | 2/2000 | Chooi et al. |
| 6,068,428 A | 5/2000 | Nair et al. |
| 6,076,652 A | 6/2000 | Head, III |
| 6,138,058 A | 10/2000 | Van Antwerp et al. |
| 6,146,057 A | 11/2000 | Gromley et al. |
| 6,173,212 B1 | 1/2001 | Valerino, Sr. |
| 6,202,004 B1 | 3/2001 | Valerino, Sr. |
| 6,290,434 B1 | 9/2001 | Celada-Gonzalez et al. |
| 6,292,710 B1 | 9/2001 | Bonnet |
| 6,356,802 B1 | 3/2002 | Takehara et al. |
| 6,437,272 B2 | 8/2002 | Tamamoto et al. |
| 6,477,442 B1 | 11/2002 | Valerino, Sr. |
| 6,516,239 B1 | 2/2003 | Madden et al. |
| 6,539,360 B1 | 3/2003 | Kadaba |
| 6,600,418 B2 | 7/2003 | Francis et al. |
| 6,659,693 B1 | 12/2003 | Perkins et al. |
| 6,665,586 B1 | 12/2003 | Ball et al. |
| 6,672,808 B1 | 1/2004 | McIntyre et al. |
| 6,702,150 B2 | 3/2004 | Sumetzberger |
| 6,711,463 B2 | 3/2004 | Tozuka et al. |
| 6,747,560 B2 | 6/2004 | Stevens, III |
| 6,762,382 B1 | 7/2004 | Danelski |
| 6,878,896 B2 | 4/2005 | Braginsky et al. |
| 6,887,358 B2 | 5/2005 | Elger |
| 6,911,910 B2 | 6/2005 | Sansone et al. |
| 6,932,544 B2 | 8/2005 | McMahon et al. |
| 6,939,088 B2 | 9/2005 | Farre |
| 6,950,724 B2 | 9/2005 | Mileaf et al. |
| 6,959,229 B2 | 10/2005 | Eidemiller |
| 7,079,913 B2 | 7/2006 | Kato et al. |
| 7,092,788 B2 | 8/2006 | Brixius et al. |
| 7,104,734 B2 | 9/2006 | Smith et al. |
| 7,136,721 B2 | 11/2006 | Sano et al. |
| 7,151,980 B2 | 12/2006 | You et al. |
| 7,196,627 B2 | 3/2007 | Rommelmann et al. |
| 7,243,002 B1 | 7/2007 | Hoganson et al. |
| 7,326,005 B1 | 2/2008 | Castro et al. |
| 7,328,084 B1 | 2/2008 | Hoganson et al. |
| 7,363,106 B1 | 4/2008 | Hoganson et al. |
| 2005/0228537 A1* | 10/2005 | Unkelbach et al. ............ 700/237 |
| 2008/0180225 A1* | 7/2008 | Hoganson et al. .......... 340/10.31 |
| 2009/0121832 A1* | 5/2009 | Mullin et al. ................ 340/5.54 |

\* cited by examiner

PNEUMATIC TRANSPORT DELIVERY CONTROL

CROSS REFERENCE TO RELATED APPLICATION

This application is a continuation of U.S. application Ser. No. 12/574,863, entitled "Pneumatic Transport Delivery Control" having a filing date of Oct. 7, 2009, which claims the benefit of the filing date of U.S. Provisional Application No. 61/104,162, entitled "Pneumatic Transport Delivery Control" having a filing date of Oct. 9, 2009, the entire contents of which are incorporated herein by reference.

FIELD

The presented inventions relate generally to the field of pneumatic tube carrier systems. More particularly, the presented inventions relate to systems and methods for and controlling and confirming the delivery of pneumatic carriers to intended recipients.

BACKGROUND OF THE INVENTION

The fundamental processing means and methods for pneumatic tube systems is well known. Their basic function is transfer of physical packets ("carriers") among a plurality of nodes or terminals ("stations"). The stations are physically interconnected by the use of pneumatic tubes/pipes, various types of switches ("transfer units", "multi-linear transfer units"), and queuing and accumulation devices and/or piping constructions ("Traffic Control Units", "Zone Gates", "Selective Bypass Zones", "Interzones"). These devices collectively define a pneumatic tube network. Interactions between these devices is generally controlled by one or more intelligent processing devices (computers, embedded controllers, programmable logic controllers, etc.) running software, firmware, or middleware to affect the desired device and system behavior to allow for successful carrier transport.

In normal operation, a sending user places a carrier in a launching device of a source station and enters the destination station through a keyboard or other interface device. The system then moves the carrier from source station to the destination station through the pneumatic tube network and its associated devices. The receipt of a carrier within the system and delivery to a destination station is often termed a 'transaction'.

In most cases, sending users interact with the system as described. Once the carrier is accepted by the system, the system accepts accountability for delivery of the carrier. In most cases, the carrier arrives at the intended destination station without difficulty. In other, specific cases, the carrier arrives at a destination station other than the intended destination station or the carrier may be returned to the sending/source station. This sometimes occurs when a part of the network needed for the intended transaction is unavailable or when the target destination station is grouped (e.g., by the system administrator) with other stations usually in close proximity. Grouping increases the overall reliability of a station-receiver combination by assuring the carrier has a place to go should the original target destination station be full or otherwise unavailable.

Under the conditions described, the actions of sender and recipient are asynchronous and uncoordinated. A sender is sending a carrier to a station, not a specific recipient, and the recipient is unaware that a carrier is inbound for their receipt. A recipient takes action when the carrier arrives and they are notified a carrier is in the station, for example, audibly via a triggered horn or alarm or visually by observing a carrier is in the station. While these methods have typically resulted in a carrier being delivered to at least the correct region of a facility (e.g., hospital), a specified recipient may or may not retrieve the carrier.

As many facilities such as hospitals are open environments, this can result in lost transactions or poor accountability between the sender and recipient. While the system and its computers can verify that a carrier has arrived, it is though inferential logic based on, for example, time of day, the intended routing through the pneumatic system and/or and the presence of other carriers that it is inferred that a specific carrier was, in fact, correctly delivered. Recipients may retrieve carriers intended for others, leaving the original recipient unsure of the system's reliability since they may never directly receive a particular transaction. Finally, payloads of some transactions are subject to pilfering. For example, monetary transactions and pharmaceutical/drug delivery transactions may be subject to unauthorized removal after delivery to a destination station. Additionally, transactions may contain confidential or privileged information the receipt of which should be limited to authorized recipients.

Pneumatic tube system manufacturers have responded by providing several methods for improving delivery side security (e.g., access control methods). The first and simplest was to develop and install physical security and barriers at the stations themselves. These measures usually include a door or barrier between the delivered carriers and the general public. The door may be transparent or opaque and may include a lock. These devices are designed to provide a modest level of physical security by assuring only authorized personnel have access to the delivered carriers. While such systems decrease the chance of unauthorized personnel and/or third parties accessing a carrier, they do little for assuring the delivered carrier is reliably delivered to a specific person. In addition and like all physical barriers, the barrier can be defeated readily by, for example, users who forget to close and/or lock the door.

Another access control method is to physically hold the carrier in the destination station away from the receiver bin, typically above the bin pneumatic tube that connects the station to the pneumatic system. Since the carrier is held out of the bin, a recipient (intended or otherwise) must interface with the system controls by entering a PIN number, access code or other means designed to assure the transaction is tied to a specific individual. Once the correct PIN has been entered, the system releases the carrier from the station and drops it into the bin for retrieval, presumably by the intended recipient.

This approach is more secure than the simple physical barrier because it (a) often requires complete disassembly of the recipient station to retrieve the carrier, effectively limiting anyone except a maintenance person from recovering the carrier by any means other than the one intended, and (b) maintains transaction control and traceability from sender to recipient. While better than the physical barrier of a door, this approach also has its limitations. For instance, system resources may be occupied and/or reserved for the secure carrier, until its delivery is complete, effectively limiting or reducing overall system throughput. For instance, a recipient station holding a secure carrier may be unavailable for sending or receiving other carriers. Such an action disrupts traffic throughout the network.

An additional limitation of this method is the retention of certain open-loop aspects of the chain of custody. For example, a system or department-wide PIN number would augment the physical barriers of carrier retention behind the door or inside the station housing, but only guarantees that the individual who received a carrier knew the PIN number. It is often inferred that a specific PIN number is specific to a particular person. However, anecdotal evidence and experience points to sharing of PIN numbers among users and/or such PIN numbers being written in conspicuous locations. Other access control methods deployed by pneumatic tube suppliers also have certain limitations. For instance, access control cards may be issued to employees and healthcare workers. Though it is intended that such a card provide access to the person to whom the card is issued, the card will provide access to any person possessing the card itself.

Biometric solutions such as fingerprint identification and retina scan seek to overcome some limitations of ownership by assuring there is no practical physical means for transferring the physical property measured (i.e. a fingerprint) and the associated system access to another person. Using these techniques, access control remains persistence, and ownership is assured. While assuring the recipient is, in fact, physically present, these methods do not verify that the carrier delivered to the recipient is the correct carrier. Again, it is inferred by the location of the carrier in the system that the transaction and is the one intended for the identified recipient. Finally, like all access control methods, these methods do not address the related problems of requiring synchrony between sender and recipient, freeing system resources until access is needed, and/or verifying the transaction and carrier are in fact the one intended for the recipient except by inference.

SUMMARY

Various aspects of the presented inventions seek to create a verifiable and closed loop chain-of-custody for a specific transaction and carrier while assuring the sender and recipient can perform asynchronous activity. That is, one aspect the presented inventions allows a sender to securely send a carrier to a desired recipient while allowing the desired recipient to receive the secured carrier at a convenient time and/or location without tying up system resources. As a result, system resources are able to be deployed for other purposes until needed to deliver the specific secured carrier to a specific recipient. This increases system security without increasing system costs as measured by throughput. Another aspect improves the physical barriers between high value payloads and the unintended recipients. This is done in part by introducing randomness into the carrier delivery process such that no member of the general public or facility staff knows the location and/or delivery time of a secured carrier without having access to specific database records indicating the current location and/or delivery status of the secured carrier.

The various inventive aspects function by combining several disparate technologies to provide unique capabilities in a pneumatic transport system. These technologies include traffic management methods and algorithms, reporting capabilities, radio frequency identification (RFID) and related technologies, database methods and technologies, remote and distributed notification methods and technologies (i.e. E-mail, paging, cell phones, etc.), and basic queuing and storage techniques. Combining these technologies for specified purposes results in novel carrier handling solutions that are economical, scalable and can address the needs of numerous healthcare and other customers. These technologies may be combined in various combinations of software, firmware, midware and hardware. In this regard, various functionality of the utilities described herein may be embodied in software products stored on computer readable media.

According to a first aspect, a system and method (i.e., utility) is provided that allows asynchronous activity between a sender of a pneumatic carrier and an intended recipient of the carrier while maintaining secure chain-of-custody control of the carrier. In this regard, a sender may initially request that a transaction be secured. That is, a secured transaction request may be received for a carrier to be dispatched/launched into the system. Such a request may be received (e.g., by a system controller) through a user interface of the pneumatic system or such a request may be received from a personal communication device of the sender. A specified recipient and/or destination location for the secured transaction is also typically received. The utility may then notify the specified recipient and/or destination location user (e.g., a desired recipient) that a secured transaction is designated for their receipt. The carrier may then be launched into the pneumatic tube system. Further, upon receiving a response signal from the desired recipient, the carrier may be directed to a location of the desired recipient (e.g., location of the specified recipient and/or the destination location).

In one arrangement, the utility may determine a specific identity of the carrier being utilized for the secured transaction. Such identification may be performed via an automated means including, without limitation, radio frequency identification (RFID), bar code readers, and optical scanners. Accordingly, upon delivering the carrier to the specified recipient and/or destination location, the carrier identity may be re-confirmed to assure that the carrier delivered is the carrier associated with the secured transaction. That is, the identity of the delivered carrier may be compared to an identity in a stored transaction record to confirm a match. After such confirmation, the carrier may be released.

Notification of the secured transaction may be performed via a pneumatic tube system interface (e.g., via a user station display) that is associated with the desired recipient. Alternatively, a messaging system may be utilized to provide notification through alternate messaging modalities. Such messaging modalities may include, without limitation, telephonic systems (landline and/or wireless), data network systems (e.g., WAN, LAN, Internet) and/or RF systems (e.g., WiFi). In this regard, the utility may include a database that includes contact information for system users/recipients. Such system users may provide one or more contact means (telephone numbers, pagers, e-mail addresses etc.) for receiving notification messages from the system. Likewise, a facility may assign communication devices (e.g. PDAs, pagers etc.) to system users. In one arrangement, the notification message is a wireless message that is delivered to a wireless user device associated with a desired recipient.

After the desired recipient is notified of the secured transaction (e.g., notified of an inbound transaction), the desired recipient may elect to receive the carrier immediately or at a time and/or location of their choosing. In this regard, the utility may after launching the carrier into the pneumatic system temporarily store the carrier within the pneumatic system while the carrier awaits delivery. In one arrangement, if the desired recipient does not promptly respond to an inbound carrier notification, the carrier is moved to a user inaccessible storage location within the system to await a response from the desired recipient. Such temporary storage is typically a device that provides carrier storage without tying-up system resources (e.g., without blocking access to a system component such as a pneumatic tube or user station). For instance, the temporary storage may be a storage device that stores carriers where each carrier is separately storable, retrievable and releasable without movement or other stored carriers. In one arrangement, the carrier is temporarily stored in the pneumatic system in a device that reads the identity of the carrier as it is received in and retrieved from temporary storage. Such (identity information) and entry/exit times for the secured transaction may be recorded to a transaction record of the secured transaction.

In one arrangement, the response may originate from a wireless device associated with the desired recipient. In another arrangement, the desired recipient may respond via an input device at a user station. In any arrangement, the recipient may indicate their availability and/or location. At this time, a system controller may generate control signals to route the carrier to the desired recipient. In a further arrangement, the desired recipient must provide an access code or PIN before the system delivers the carrier (e.g., from temporary storage). In such an arrangement, the access code or PIN may be delivered to the desired recipient, for instance, with the original notification or in a second notification after the response signal is received.

In one arrangement, the utility dynamically generates an access code or PIN that a desired recipient receives and must utilize to receive the secured transaction. In this arrangement, upon receiving notification that a desired recipient of a secured transaction is available to receive the transaction, an access code is generated (e.g., utilizing a random number or code generator etc.) and delivered to the desired recipient. In one arrangement, the dynamically generated access code is delivered to a wireless device associated with the desired recipient. In a further arrangement, the desired recipient may be required to provide a predetermined acknowledgment receipt code indicating they have received the dynamically generated access code. In any case, the desired recipient may be required to enter the access code into a receiving station (e.g., at the destination location or a user specified receiving station) in order to receive the secured transaction.

In another aspect, a utility is provided for improving traffic flow in a pneumatic tube system. As may be appreciated, in many instances multiple users may utilize a single receiving station. In these instances, it may be beneficial for one of the users to utilize an alternative station to reduce congestion. Accordingly, the present utility allows a user to contact the pneumatic system control and indicate they have moved to an alternate station. Such contact may be through a user interface at a user station and or via a separate messaging system. In any case, upon receiving an indication that a particular user has changed receiving locations, the utility is operative to identify transaction records where the particular user is the intended recipient and route carriers intended for that user to their current location irrespective of the destination location indicated by senders.

In another aspect, a system and method (i.e., utility), is provided that allows for generating access codes for each secured transaction. The utility includes receiving an input requesting a secured transaction for a carrier that is received at an origination location/station in a pneumatic carrier system. Upon receiving such a transaction request, a message is sent to a communication device associated with an intended destination or a specific recipient (e.g., desired recipient). In one arrangement, the message includes an access code that is required to be entered into the pneumatic system in order to receive the carrier. The carrier is then delivered to a location of the desired recipient. In one arrangement, the carrier is released upon receiving the access code after delivery. In another arrangement, the carrier may be transported to an intermediate location (e.g., a user inaccessible location) for temporary storage while awaiting receipt of the access code.

The access code may be a randomly generated access code that is generated for each secure transaction. Further, such access codes or PINs may be time dependent. In this regard, such access codes may expire after a predetermined period (e.g., one hour, two hours, etc.). Upon expiration of such an access code, a message may be generated and sent to the sending user to request additional instructions. Alternatively, the carrier may be returned to the sender.

In another aspect, a system and method (i.e., utility), is provided for asynchronous delivery of pneumatic carriers within a pneumatic carrier system. The utility includes receiving a request for delayed delivery. Such a request typically includes a destination location or specified recipient (e.g., desired recipient) and, in some arrangements, a desired delivery time. The carrier is transported from an origination station to an intermediate location within the system where the carrier may be stored awaiting delivery. A message is sent to a desired receipt of the transaction to identify recipient availability. Such a message may be sent at a sender specified time. Upon receiving a response from the recipient indicating availability and/or recipient location, the carrier is retrieved from the temporary storage location and transported by the pneumatic tube system to the recipient. In various arrangements, the recipient may be sent an access code in conjunction with the message requesting availability. In a further arrangement, after the recipient indicates their availability, an access code may be generated and sent to the user who may be required to enter the access code into a destination station prior to initiating transport of the carrier from storage. In the presented aspect, a sender may elect to delay delivery of a carrier to a subsequent time. For instance, a carrier may be launched into the system for secure, user inaccessible storage until a later specified time (e.g., at the open of business the next day, etc).

In a further aspect, a system and method (i.e., utility) is provided that allows for pre-delivery notification of inbound carrier or carriers slated for delivery to a destination location or a specified recipient. The utility include receiving a transaction request identifying a destination location and/or specified recipient for a carrier to be launched from an origination location. The utility further includes sending a message to a wireless user communication device associated with the destination location and/or the specified recipient. The carrier is launched into the system for deliver or for temporary storage. In one arrangement, the carrier is not delivered or is not launched until a an availability response is received from a user at the destination location or the specified recipient. In the latter regard, delivery may be delayed without use of an intermediate storage location.

DETAILED DESCRIPTION

Reference will now be made to the accompanying drawings, which at least assist in illustrating the various pertinent features of the present invention. In this regard, the following description is presented for purposes of illustration and description. Furthermore, the description is not intended to limit the invention to the form disclosed herein. Consequently, variations and modifications commensurate with the following teachings, and skill and knowledge of the relevant art, are within the scope of the present invention.

Overview

Disclosed herein are various systems and methods (hereafter delivery systems) that allow for, inter alia, improving the controlled delivery of a specified transaction and its associated carrier to a specified recipient. The delivery systems create a verifiable chain-of-custody for the specific transaction and carrier. Further, the delivery systems allow a sender and recipient to perform asynchronous activity. That is, the delivery systems allow a sender to initiate a transaction without coordinating a delivery time and/or location with a specified recipient while assuring that the carrier will only be delivered to the specified recipient. In this regard, the carrier may be securely maintained within a pneumatic tube system while awaiting delivery. Importantly, while the secured carrier is maintained within the pneumatic tube system awaiting delivery, system resources are available to other users. That is, the pneumatic tube system resources are able available to process other transactions until needed to deliver the specified carrier (e.g., secured or high-value carrier) to the specified recipient. This allows for increasing system security without increasing system cost as measured by throughput.

The delivery system functions by combining pneumatic tube system technologies with remote and/or distributed messaging capabilities. The pneumatic tube system technologies include, without limitation, traffic management methods and algorithms, reporting capabilities, radio frequency identification (RFID) and related technologies (e.g., bar code scanners, etc.), database methods and technologies and basic queuing and storage techniques. Remote and/or distributed messaging capabilities may be provided via, without limitation, E-mail, paging, cell phones, etc.

Pneumatic Carrier System Overview

Figure 1:
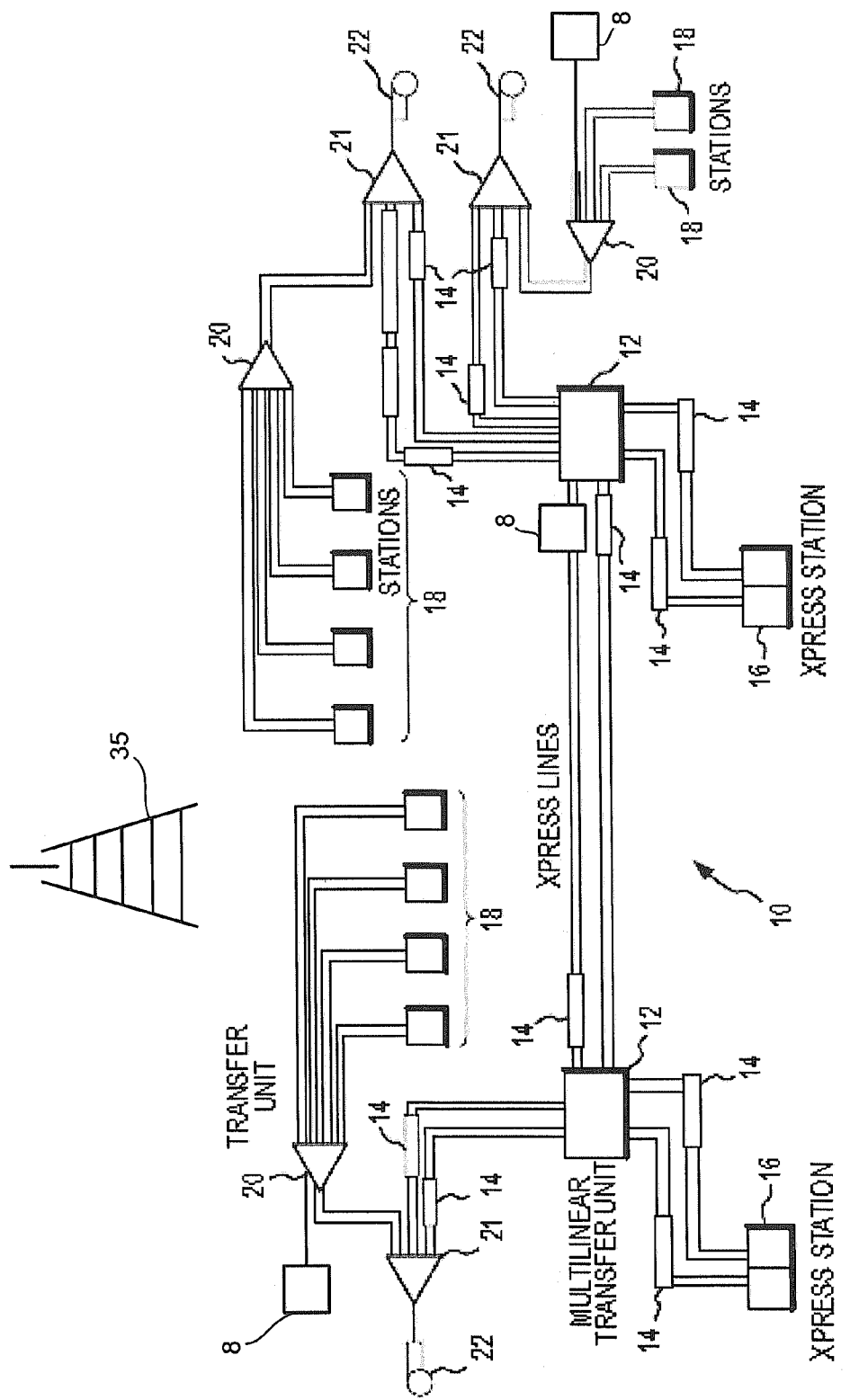
FIG. 1 illustrates a mechanical diagram for the pneumatic carrier system.

FIG. 1 illustrates a system diagram for one exemplary pneumatic carrier system 10 within which the various aspects of the inventions described herein are employable. It will be appreciated that other system configurations are possible and are within the scope of the presented inventions. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 is a transfer unit 20 which orders carriers arriving through different tubes from a different station 16, 18 into a single pneumatic tube. This pneumatic tube is further in connection with a vacuum bypass transfer unit 21 (i.e., a turnaround transfer unit) and a blower 22 that provides the driving pneumatic force for carrier movement. A set of transfer units 20, 21, a blower 22 and one or more stations 16, 18 typically define a single zone. Generally, the blower 22 of each zone is operative to create pressure and/or vacuum (i.e., system pressure) within the pneumatic tube(s) of that zone. This pressure/vacuum is operative to create a pressure differential across a carrier disposed within the pneumatic tubes and causes the carrier to move through the pneumatic tubes. That is, the blower 22, transfer units and pneumatic tubes create a pneumatic circuit for use in transporting carriers between first and second points within the system 10. Multiple different zones may be interconnected (e.g., using a multi-linear transfer unit 12) to collectively define the pneumatic carrier system 10.

Within the system 10 itself, one or more devices are employable for ordering and routing carriers to their selected destinations. One type of device is a traffic control unit (TCU) 14 which is employable to receive, temporarily store and release a number of carriers. This functionality allows for launching a carrier from a user station 16, 18 prior to a path for a destination location being established. Likewise, this allows carrier tubes interconnecting the user station 16, 18 to be cleared for incoming traffic.

Also included in the system 10 are multi-linear transfer units (MTUs) 12 which have functionality to direct carriers from one pneumatic tube to another pneumatic tube (e.g., between tubes in single zone or between different zones). For example, a MTU 12 may receive a carrier released by a TCU 14 in a first pneumatic tube and direct the carrier into a second pneumatic tube in the system 10 to complete a given transaction. The configuration of the TCUs 14 and MTUs 12 will be described in greater detail below.

Also included within the system 10 are one or more temporary storage locations or vaults 8. Though referred to as vaults, it will be appreciated that such devices may be represented by storage devices that are inaccessible to most users of the system. IN any embodiment, these vaults 8 are operative to receive and securely store carriers while the carrier awaits delivery. In this regard, a first user (i.e., sender) may launch a carrier into the system that is intended for receipt by a specified recipient or user station. If the recipient or user station is not available to receive the carrier, the carrier may be moved to one of the vaults 8. Upon the system receiving an indication that the specified recipient or user station is ready to receive the carrier, the vault 8 is operative to re-launch the carrier into the system. Vaults and storage locations may be placed and positioned advantageously throughout the system based on the scalable needs of a particular user or set of users. Some vaults might service a single station while others might service a system zone or even an entire system. Such temporary storage devices or vaults in two-dimensional matrixes (e.g., 1×10, 2×10 etc), wherein each carrier is separately storable, retrievable and releasable without movement of other carriers stored in the matrix. However, it will be appreciated that certain aspects of the present invention are applicable to other configurations.

The system 10 also utilizes a messaging system 35 to provide a specified recipient notification that a carrier for their receipt has been launched. The messaging system 35 also allows the recipient to provide an indication of availability time and/or location for receipt of the carrier. The messaging system is more fully discussed below.

Figure 2:
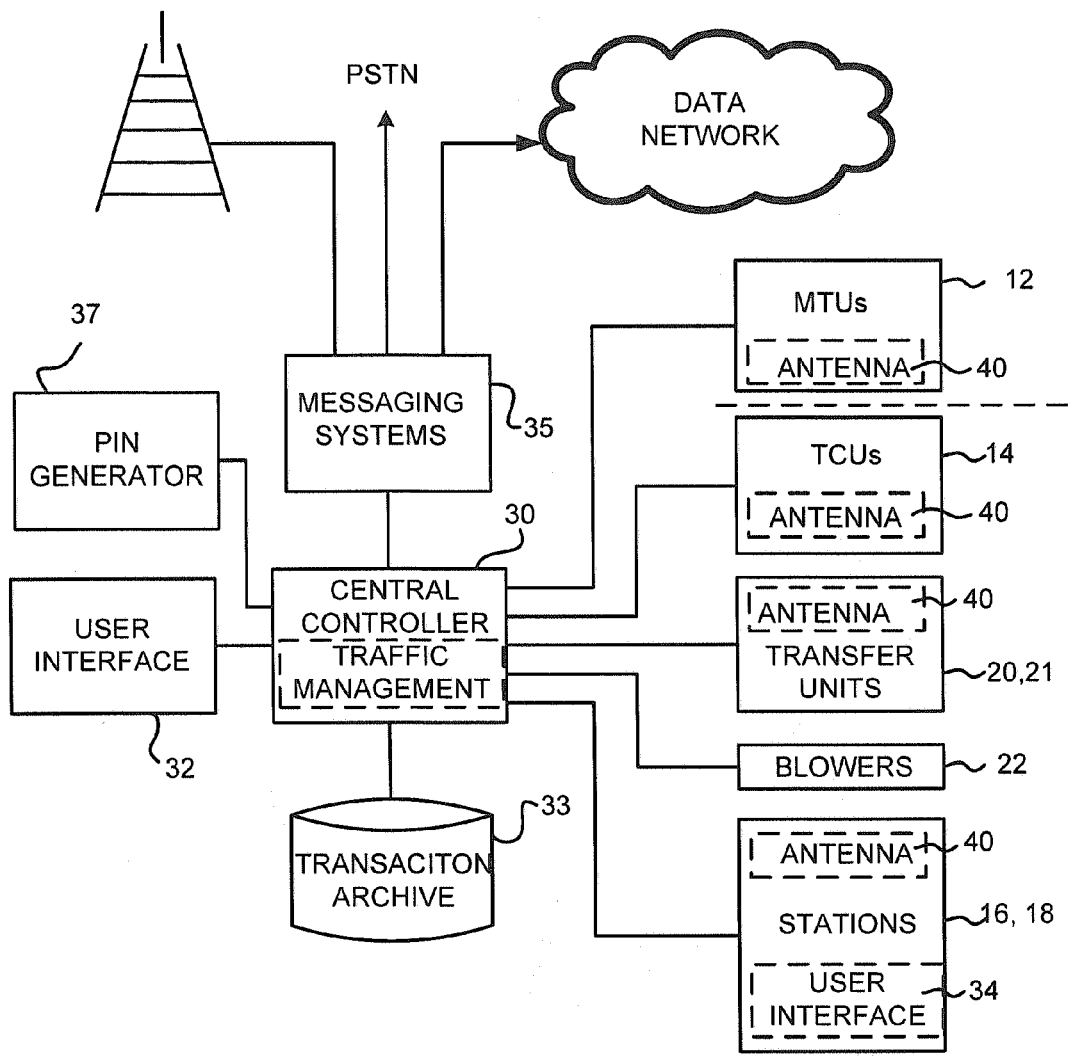
FIG. 2 illustrates a system diagram for the operation and monitoring of the pneumatic carrier system.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 34. In addition to controlling the operation of the carrier system 10 as depicted in FIG. 1, the SCC 30 provides additional delivery functionality. Such functionality includes, without limitation, interconnection to the messaging systems 35 and use of multiple radio frequency identification (RFID) antennas 40 or other carrier identification devices (e.g., bar code readers) that may allow for identification of carriers within the system 10. In the latter regard, a system for RFID identification within a pneumatic carrier system is described in co-pending U.S. Pat. No. 7,243,002 entitled "System and Method for Carrier Identification in a Pneumatic Carrier System" having a filing date of Nov. 17, 2004, the contents of which are incorporated by reference herein.

Use of carrier identification devices allows for the movements of a carrier passing through the system to be recorded to a transaction record for each carrier transport operation. For instance, for each initiated carrier transaction the system may generate a transaction record that is stored to computer readable storage media. Such records may include, without limitation, the location where and when a carrier entered the system, the identity of the sender and a destination location for the carrier. Further, use of antennas or readers throughout the system may also permit monitoring and recording the movements of the carrier throughout the system. For instance, the vaults may each include a reader or antenna that allows the vault to identify a carrier when it is received as well as identify the carrier for retrieval and re-launch into the system. Again, the time of entry into and exit from the vault may be recorded into the transaction record.

As noted, the messaging system 35 is interconnected to the SCC 30. This messaging system 35 is operative to send and receive communications to users of the pneumatic tube system. In this regard, it will be noted that the messaging system may be a multi-mode messaging system. For instance, the messaging system 35 may be interconnected to a data network such as, for example, a LAN, WAN and/or internet. In this regard, the messaging system may be operative to send and receive data communications (e.g., e-mail) with users of the pneumatic tube system. Alternatively and/or additionally, the messaging system 35 may be interconnected to one or more telephonic systems including, for example, a public switch telephone network (PSTN) and/or cellular communication devices. Likewise, the messaging system may be interconnected to any wireless communications systems (e.g., radio frequency, Bluetooth, etc.) that allow for transmitting and receiving messaging signals throughout at least a portion and more preferably the entirety of a facility utilizing the pneumatic tube system 10.

Also interconnected to the SCC 30 is a personal identification number (PIN) generator 37. As is further discussed below, the PIN generator 37 is operative to dynamically generate PIN numbers (or other access codes) for delivery by the messaging system 35 to a recipient of a high value or secured carrier. In this regard, a new PIN number may be generated for each secure transaction and delivered to a desired recipient of that transaction. Accordingly, the recipient may be required to utilize the dynamically generated PIN number in order to receive the secured transaction. As may be appreciated, such dynamic generation of the PIN number reduces the likelihood of third parties obtaining the PIN number of a desired recipient. That is, in contrast to systems that utilize static PIN numbers that are assigned to individuals, and which may become compromised over time, the dynamic generation and forwarding of such PIN numbers increases the likelihood that only the desired recipient may have the PIN number in a timeframe during which delivery of a secured carrier is performed.

Also, connectable to the SCC 30 are one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units. While the single block components shown in FIG. 2 are representations of various electrical and electro-mechanical systems that may be employed by the pneumatic carrier system 10, one skilled in the art will realize that the block for each type of device represents the electronics for a number of the same or similar type of components positioned throughout the system which provides for its operation.

Figure 3:
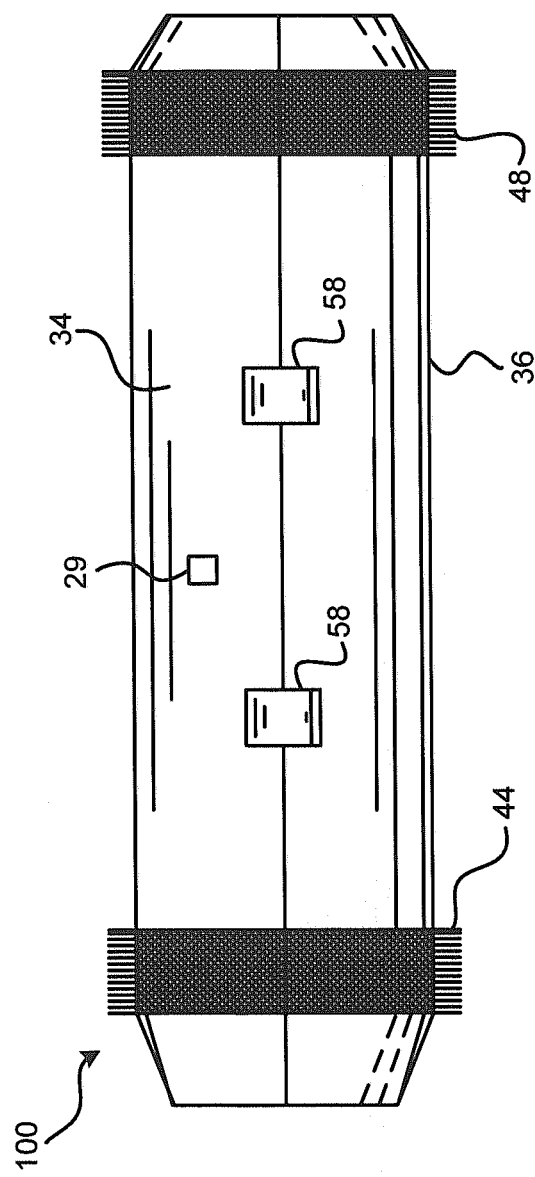
FIG. 3 illustrates a view of the pneumatic carrier including an identification chip.

One type of carrier 100 that may be utilized with the system 10 is illustrated in FIG. 3 and includes first and second shell members 34 and 36 that collectively define an enclosed space for use in carrying materials as they are transported through the system 10. These shell members 34, 36 are adjoinably cylindrical in cross-section for use in correspondingly cylindrical pneumatic tubes of the system 10. The shell members 34 and 36 may be pivotably interconnected by a hinge member (not shown), and latches 28 may be provided for securing the first shell member to the second shell member in a closed configuration. Also included as part of the carrier 100 are wear bands 44, 48. The wear bands 44, 48 are sized to snuggly fit within the inside surface of the pneumatic tubes in order to substantially block the passage of air across a carrier 100 within such a pneumatic tube. Accordingly, this blockage results in a pressure differential across the carrier 100 that results in the carrier 100 being pushed or drawn through the pneumatic tube. In the illustrated embodiment, an RFID chip 25 is attached to one of the shell members 34. In this regard, antenna device/readers 40 incorporated into components (e.g., stations, transfer units, vaults, etc.) within the system may monitor the location and/or translocation of the carrier through the system.

In operation, the antenna devices/readers 40 positioned throughout the pneumatic carrier system identify carriers 100 as they pass from one location to another. Generally, when a carrier 100 is to be employed for carrying a payload from an origination station 16, 18 to a destination station 16, 18, it may be identified using the antenna device/reader 40 at the origination station 16, 18. Once a destination is selected for the particular carrier 100, the identification information may be associated with the path calculated for the carrier 100 through the pneumatic carrier system 10 and the destination. This information may be stored in a data entry (e.g., transaction record) within the transaction archive 33. As the carrier 100 moves from one location to another, the antenna device/reader 40 at the various locations will energize the ID chip 29 and extract the identification information. Once a carrier 100 reaches a destination, the ID chip 29 information may then be confirmed against transactions that are intended to be received at the particular destination. Additionally, upon arrival at a destination, a confirmation may be provided to the origination station.

Enhanced Delivery System

Figure 4:
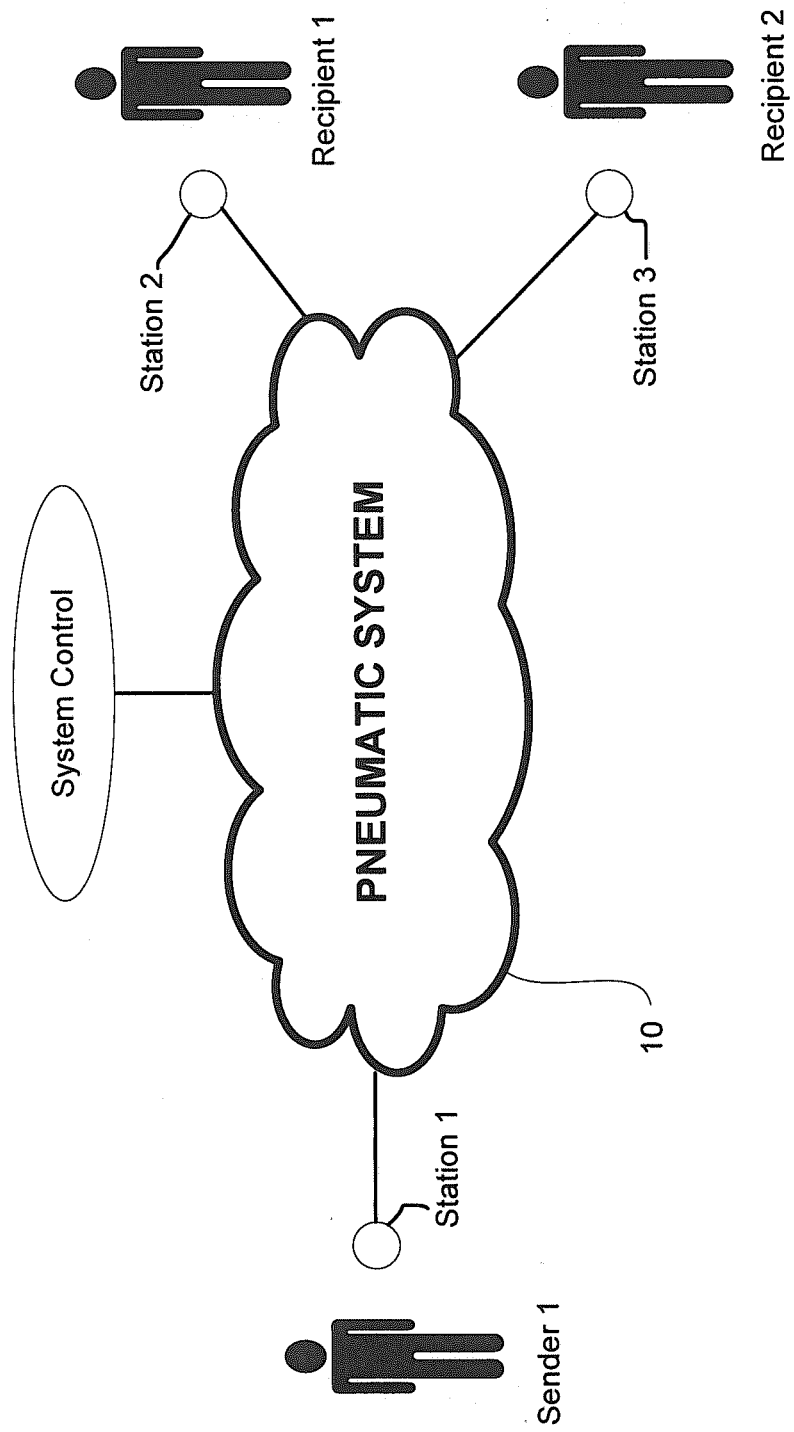
FIG. 4 illustrates a prior art pneumatic system.

As noted above, there are often situations where it is desirable to assure that a specific carrier will be delivered to a specific recipient. FIG. 4 outlines the basic situation. Three users are attempting to interface with the pneumatic carrier system 10. Sender 1 has a number of transactions, some bound for Recipient 1, and some bound for Recipient2. Sender 1 values the transactions highly, and desires continuing control and delivery verification of the transactions. However, Sender 1 may not have time energy, or inclination to maintain a synchronous line of communication with the recipients. That is, the sender may not want to contact each recipient and inform them that a carrier is being sent to them and/or re-contact the recipient to confirm they have received the carrier. Rather, Sender 1 would like the pneumatic carrier system 10 and its controller 30 to assume control of the carrier and its contents and take independent, verifiable actions that assure either the carrier is delivered to the desired recipient (not just the desired station), or it is delivered to a secondary or tertiary destination or recipient (or returned to the sender) in the event the primary destination or recipient is unavailable or unresponsive.

Figure 5:
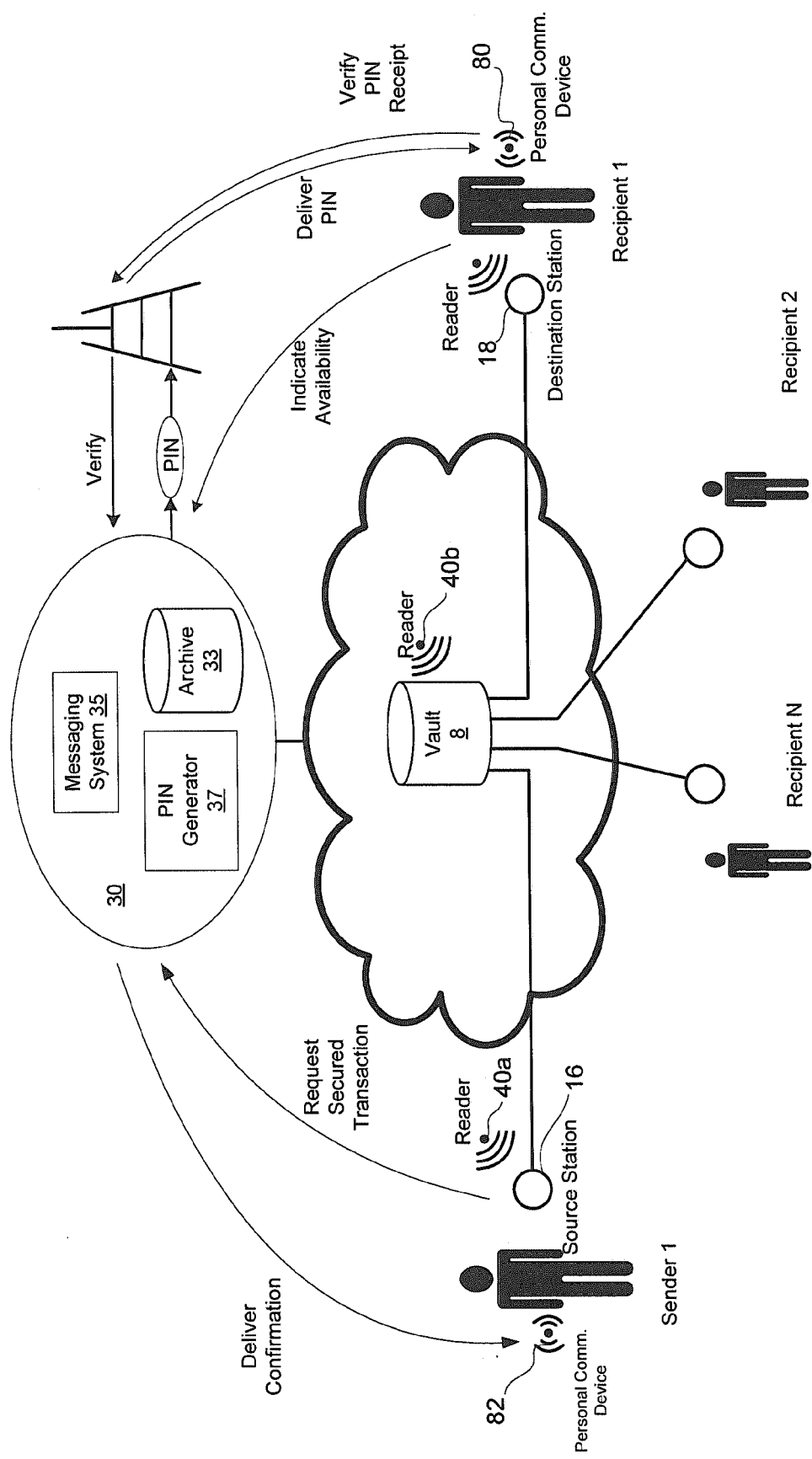
FIG. 5 illustrates a pneumatic system in accordance with the present invention.
Figure 6:
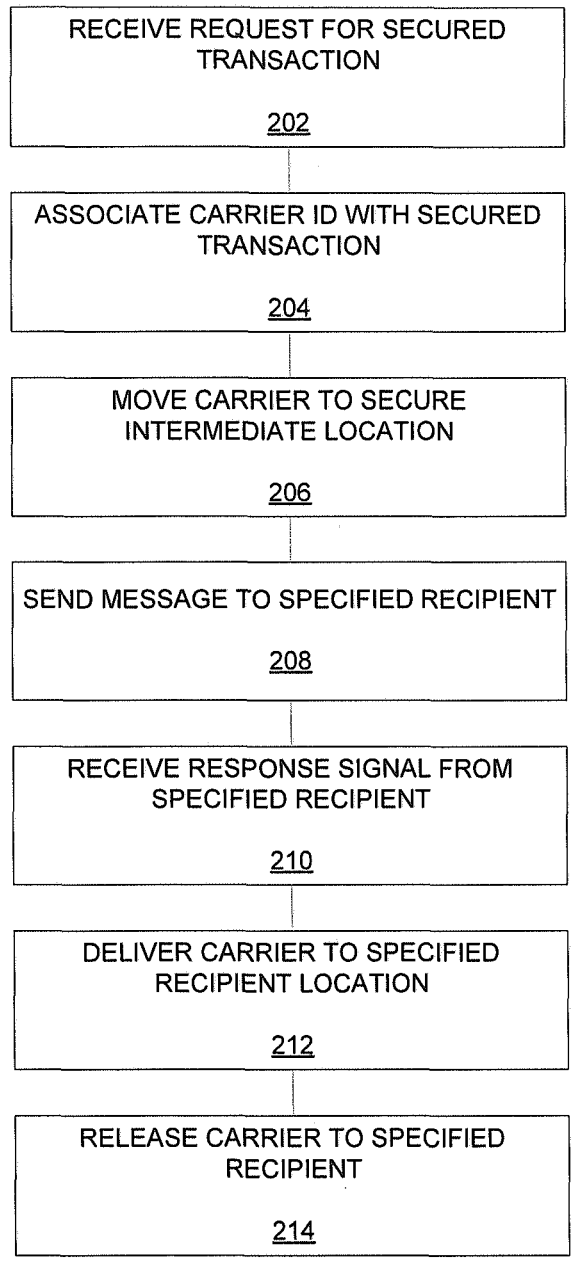
FIG. 6 illustrates one process that may be implemented with the pneumatic system of FIG. 5.

FIGS. 5 and 6 illustrate a situation where Sender 1 requests (202) a secure transaction. Sender 1 also provides destination location and/or an identifier for Recipient 1 such as employee identification or name. Sender 1 may also provide a secondary recipient in some embodiments. Further, Sender 1 may in some embodiments specify a delivery time for the carrier (e.g., tomorrow at 9 AM). The system utilizes an antenna or reader 40a at the system entrance (e.g., source or originating user station 16) and associates (204) the secure transaction with a unique identification of the carrier being sent by the sender. The system may also associate the identity of the sender with the secured transaction. Any or all of this information including the desired recipient(s) and/or delivery time may be recorded in a transaction record that may be stored within the archive 33. The system accepts the transaction and records the relevant information in its database, sending (if desired) a confirmation email or other receipt of the systems acceptance of the transaction to the sender. Such confirmation/receipt may be sent via any messaging modality of the messaging system and/or via a user interface of a station where the secure transaction is requested.

The system controller generates the necessary control signals to transport (206) the carrier to an intermediate location or storage device (e.g., vault 8) to stores the carrier until the desired recipient can be notified. In one embodiment, the carrier is stored in a temporary storage device or vault 8 that is located within the system and which is inaccessible to system users. Preferably, the temporary storage device allows for storing one or more carriers without occupying system resources in a manner that limits or reduces overall system throughput. For instance, the carrier may be moved to a matrix type storage that allows for carriers to be separately storable, retrievable and releasable without movement of other carriers stored in the matrix. In any arrangement, the storage device may include a reader 40b that allows for reading the unique identity of a carrier received therein. Accordingly, the transaction record for the carrier may be updated to indicate that the carrier is located within the storage device and/or the time the carrier was received by the device. Likewise, when removing a carrier from the storage device, the reader 40b may be used to identify a correct carrier, and the transaction record may be updated to indicate when the carrier left the device.

The Recipient 1 is notified (208) of the existence of a secured carrier transaction that is intended for their receipt. Such notification may be performed in conjunction with receiving the secured transaction request (202) or the notification may be performed after the carrier is moved to the intermediate storage location. In any case, a message is directed to the recipient indicating that they are the specified recipient of a specific carrier. Such a message may be sent using the messaging system 35, which may include any messaging modality as discussed above. That is, such messages may be sent to one or more personal communication devices 80 of the specified recipient. Alternatively, such a message may be sent to an input/output device (e.g., monitor) of a destination user station 18 associated with the specified recipient (e.g., a station located where the recipient works). If the specified recipient (e.g., Recipient 1) promptly responds to the inbound secured transaction notification, the carrier may skip storage in the intermediate location and proceed directly to destination location 18 of Recipient 1. More typically, the carrier is moved to the temporary storage location or vault 8 to await delivery.

The carrier may be stored until a response is received (210) from the specified recipient. In this regard, the specified recipient may respond via their personal communications device 80 or via a user station. The response may indicate readiness to receive the carrier, confirm the presence of the recipient at a destination location 18 and/or indicate their presence at an alternate location. In the latter regard, Recipient 1 may indicate a current location other than that specified by Sender 1. Accordingly, if all credentials are verified (e.g., entering an ID, card swipe, facial recognition, etc.), the system 10 may dynamically re-route the carrier to a current location of Recipient 1. In any case, after the recipient has indicated their availability and/or location, the carrier may be delivered (212) to the destination specified by the sender or the recipient. The carrier may be released (214) immediately or may be maintained by the destination station until the recipient provides necessary credentials. The receipt and time of the response signal, any alternate destination location, time of delivery and/or any recipient supplied credentials may be recorded to the transaction record. Finally, a confirmation may be sent to the sender via, for example, the user station or a personal communications device 82 of the sender. As will be appreciated, each step of the process may be recorded to a transaction record. Such transaction records may be archived.

Figure 7:
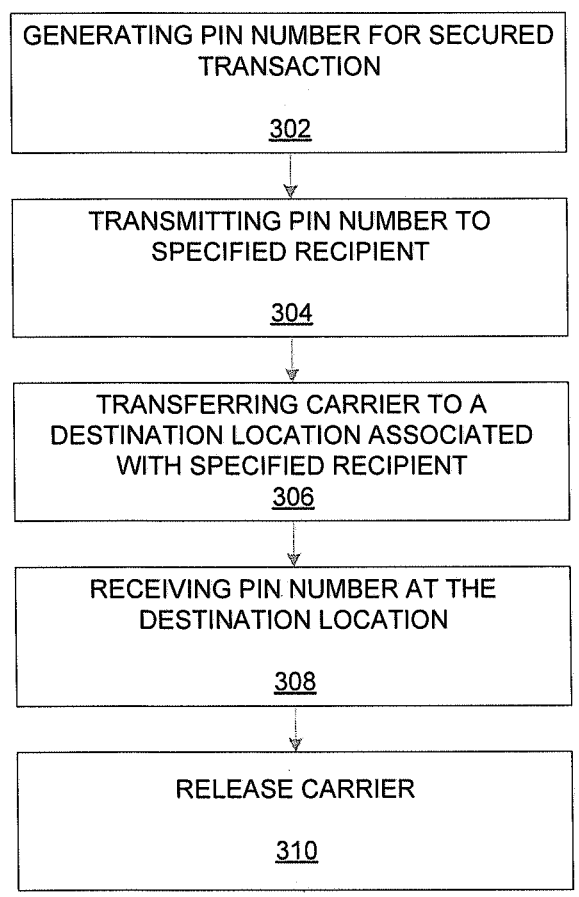
FIG. 7 illustrates another process that may be implemented with the pneumatic system of FIG. 5.

In another embodiment, a further layer of recipient confirmation is added. As illustrated in FIGS. 5 and 7, a process 300 is implemented upon receiving a signal indicating the Recipient is available to receive the transaction. Specifically, the SCC 30 dynamically generates (302) and sends (304) a PIN or other access code to a personal communication device 80 of Recipient 1. Such a personal communication device may include any wireless device including, without limitation, pagers, cell phones, and portable e-mail devices. In one embodiment, the PIN/access code is a non-persistent, expiring code that requires the recipient utilize the code to access the transaction within a specified time frame. Recipient 1 may be required to acknowledge PIN receipt. The carrier begins transfer (306) from the vault 8 or other temporary storage to the destination station 18 currently occupied by Recipient 1. Once carrier arrives at the station 18, Recipient 1 enters the transmitted PIN. Upon receiving (308) and confirming the PIN, the system releases (310) the carrier to Recipient 1. This process confirms Recipient 1 has the carrier and allows for clearing the PIN by the system based on the carriers receipt.

In any of the processes disclosed herein, a reader 40c at the destination station 18 may read the identification information of the carrier that arrives at the station to confirm the arriving carrier is in fact the carrier associated with the secured transaction. If the carrier is confirmed, the transaction closes and a confirmation record is entered into the transaction record.

The ability of users to communicate with the system controller provides additional functionality to the pneumatic carrier system 10. For instance, often two or more users are assigned or work in proximity to a single user station. This may be inconvenient for both receivers to wait for delivery of their carriers in a serial process. Under these conditions, Recipient2 can move to a different station log in through means previously identified, and request delivery of his/her transactions to an alternate location rather than the one occupied by Recipient 1. Delivery process and confirmation would function at this station similarly to that described for Recipient 1.

Figure 8:
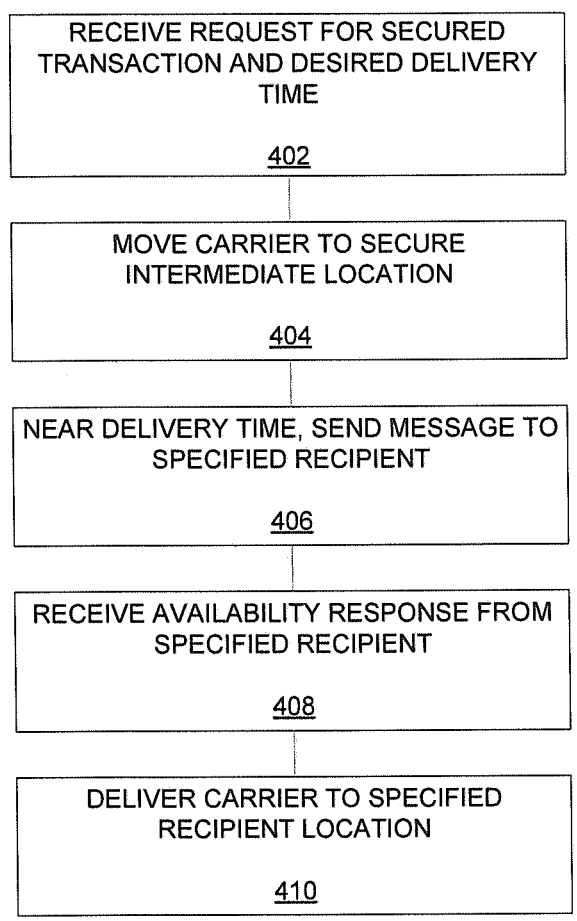
FIG. 8 illustrates another process that may be implemented with the pneumatic system of FIG. 5

The ability to securely store carriers within the pneumatic system in conjunction with use of messaging systems also allows for implementation of further delivery options. For instance, the ability to store carriers securely within the system without tying up system resources allows for delayed delivery options. For instance, a user may launch a carrier into the system for delivery at a future time. See FIG. 8. In this regard, the system may receive a request for delayed delivery that indicates a desired recipient or destination location as well as desired delivery time (402). A reader or other communications device may read the identity of a specific carrier for which delayed delivery is requested. Accordingly, such information may be recorded to transaction record. The carrier may then be moved (404) to and intermediate location within the pneumatic carrier system to await the specified delivery time. At or near the specified delivery time, the system may send a message (406) to desired recipient or destination location of the delayed delivery carrier. Upon receiving an availability response (408) from the specified recipient or destination location, the carrier may be removed from storage and delivered (410) to the destination location. As above, further functionality may be incorporated into the delayed delivery process. For instance, after receiving an availability notification from a desired recipient, a PIN numbers/access code may be generated and forwarded to the desired recipient. Likewise, the desired recipient may in a response message indicate a current location that is different than the location specified in the delayed delivery request. Again, if adequate verification is provided the system may dynamically reroute the carrier to the current location of the desired recipient. All information may be recorded in a transaction record.

In any of the above processes, if a carrier is sent to an intermediate location to await delivery to a desired recipient, the system may be operative to, after a predetermined time, re-contact the sender for additional instructions or send the carrier to a secondary recipient. For instance, if the carrier is maintained at the intermediate storage for a predetermined time and/or a sender specified time (e.g., one hour, two hours, etc.), the system may re-contact the sender for additional information utilizing the messaging system 35. At such time, the sender may provide updated recipient information allowing the system to deliver the carrier to a secondary recipient. Alternatively, the sender may request that the carrier and its contents be returned to the sender. Accordingly, the sender may access a user station and send notification of their current whereabouts to the system. The system may either return the carrier to the sender or send an access code/PIN to a personal communications device of the sender as set forth above. Again, a transaction record may be generated that provides detailed accounting of the location and possession of the carrier.

The foregoing description of the packaging design has been presented for purposes of illustration and description. Furthermore, the description is not intended to limit the invention to the form disclosed herein. Consequently, variations and modifications commensurate with the above teachings, and skill and knowledge of the relevant art, are within the scope of the invention. The embodiments described hereinabove are further intended to explain best modes known of practicing the invention and to enable others skilled in the art to utilize the invention in such or other embodiments and with various modifications required by the particular application(s) or use(s) of the invention. It is intended that the appended claims be construed to include alternative embodiments to the extent permitted by the prior art.

The invention claimed is:

1. A method for use in a pneumatic carrier system that includes a plurality of user stations, pneumatic tubes and transfer devices, comprising:
   receiving an input identifying a recipient of a carrier at located at an origination station within the pneumatic carrier system;
   sending a message to the recipient of the carrier, wherein said message indicates that the carrier is slated for delivery to the recipient;
   transporting the carrier to a destination station associated with a destination location of the recipient via the pneumatic tube system;
   receiving a response from the recipient in response to said message, said response including recipient identification credentials;
   upon confirming credentials from the recipient, generating an access code specific to the carrier on an output device for receipt by the recipient; and
   upon the access code being received via an input device at the destination station, providing access to the carrier.

2. The method of claim 1, further comprising:
   randomly generating the access code.

3. The method of claim 1, further comprising:
   after providing access to the carrier, sending a delivery confirmation message to one of:
      a display device of the origination station; and
      a communication device associated with the origination station.

4. The method of claim 1, wherein generating the access code on the output device comprises delivering the access code of a wireless communication device of the user.

5. The method of claim 1, wherein providing access to the carrier comprises releasing said carrier into a user accessible location within the destination station.

6. The method of claim 1, wherein receiving said response from the recipient further comprises receiving the destination location of the recipient.

7. The method of claim 1, further comprising:
   sending the message to the recipient prior to transporting the carrier.

8. The method of claim 7, further comprising
   moving the carrier to a user inaccessible storage location within the system prior to the access code being entered into the input device.

9. A method for use in a computerized controller for operating a pneumatic carrier system where the pneumatic carrier system includes a plurality of user stations, pneumatic tubes and transfer devices, comprising:
   receiving, from a first system user, a carrier transaction request for a carrier to be dispatched by an originating user station;
   receiving an input identifying a second system user who is an intended recipient of the carrier;
   generating signals to effect movement of the carrier to a user inaccessible storage location within the system;
   sending a message to the second system user, wherein said message indicates that a carrier is slated for delivery to the second system user;
   receiving a response from the second system user, wherein said response includes a destination location of the second system user; and
   upon receiving a response signal from the second system user, generating control signals to effect delivery of the carrier, via the pneumatic system, to said destination location of the second system user.

10. The method of claim 9, wherein the response signal further includes:
an indication of availability.

11. The method of claim 9, wherein sending said message comprises sending a message to a wireless communication device of said second system user.

* * * * *

UNITED STATES PATENT AND TRADEMARK OFFICE
CERTIFICATE OF CORRECTION

| | | |
|---|---|---|
| PATENT NO. | : 9,292,823 B2 | |
| APPLICATION NO. | : 14/314714 | |
| DATED | : March 22, 2016 | |
| INVENTOR(S) | : Kenneth Michael Hoganson and John Alan Kennedy | |

It is certified that error appears in the above-identified patent and that said Letters Patent is hereby corrected as shown below:

Specification

At Column 6, line 42, after the word until, delete "a".

Claims

At Column 14, line 5, claim 1, delete "at".

Signed and Sealed this
Fourteenth Day of June, 2016

Michelle K. Lee
*Director of the United States Patent and Trademark Office*